United States Patent [19]

Petri et al.

[11] Patent Number: 5,529,856
[45] Date of Patent: Jun. 25, 1996

[54] FUEL CELL HAVING SOLIDIFIED PLASMA COMPONENTS

[75] Inventors: Randy J. Petri, Crete; Estela T. Ong, Chicago, both of Ill.

[73] Assignee: Electric Power Research Institute, Palo Alto, Calif.

[21] Appl. No.: 439,695

[22] Filed: May 12, 1995

Related U.S. Application Data

[63] Continuation of Ser. No. 4,521, Jan. 14, 1993, abandoned.

[51] Int. Cl.$^6$ .............................. H01M 4/86; H01M 8/14
[52] U.S. Cl. .................. 429/41; 429/16; 429/44; 429/46
[58] Field of Search ................... 429/41, 44, 46, 429/16

[56] References Cited

U.S. PATENT DOCUMENTS

| | | | |
|---|---|---|---|
| 4,404,267 | 9/1983 | Iacovangelo et al. | 429/41 |
| 4,480,017 | 10/1984 | Takeuchi et al. | 429/41 X |
| 4,526,845 | 7/1985 | Reiser et al. | 429/41 |
| 4,562,124 | 12/1985 | Ruka | 429/31 X |
| 4,910,100 | 3/1990 | Nakanishi et al. | 429/32 |
| 5,206,095 | 4/1993 | Donado et al. | 429/16 |

Primary Examiner—John S. Maples

[57] ABSTRACT

Fuel cells, fuel cell components, and other electrochemical devices and components fabricated by plasma spraying. Devices such as fuel cells may be made by plasma spraying and then assembling individual components or by plasma spraying components on other components to form a laminate.

6 Claims, 1 Drawing Sheet

FUEL CELL HAVING SOLIDIFIED PLASMA COMPONENTS

This is a continuation of copending application Ser. No. 08/004,521 filed on 14 Jan. 1993, now abandoned.

TECHNICAL FIELD OF THE INVENTION

The present invention relates to methods for manufacturing electrochemical devices and components for electrochemical devices and, more specifically, to novel, improved methods of that character which make use of plasma spraying.

One currently important application of the present invention is in the manufacture of fuel cells and fuel cell components, and the principles of the present invention will be developed by reference to that application. However, there are many other electrochemical devices and components which the methods disclosed herein may be used to make— for example, chemicals from fuels (Chem Cell) and SOFC (solid oxide fuel cell) components. Therefore, it is to be understood that the approach identified above has been adopted only in the interests of conciseness and clarity and is not intended to limit the scope of invention as defined in the preceding claims.

BACKGROUND OF THE INVENTION

Fuel cells were invented in 1839 by Sir William Grove. A fuel cell is an electrochemical device which directly combines a fuel such as hydrogen and an oxidant such as oxygen to produce electricity and water. It has an anode and a cathode spanned by an electrolyte. Hydrogen is oxidized to hydrated protons on the anode with an accompanying release of electrons. At the anode, oxygen reacts with protons to form water, consuming electrons in the process. Electrons flow from the anode to the cathode through an external load, and the circuit is completed by ionic current transport through the electrolyte.

Fuel cells do not pollute the environment. They operate quietly, and they have a potential efficiency of ca. 80 percent. Virtually any natural or synthetic fuel from which hydrogen can be extracted—by steam reforming, for example—can be employed.

A variety of electrolytes have been proposed. These include: aqueous potassium hydroxide, concentrated phosphoric acid, fused alkali carbonates, and stabilized zirconium oxide. Molten carbonate fuel cell (MCFC) power plants are of particular interest. A MCFC power plant, for example, offers cost savings and increased efficiency in converting natural gas to electrical energy in comparison to other available techniques for accomplishing this goal such as using this abundantly available gas to fuel a gas turbine engine (potential conversion efficiency of 30%). Because of cost, performance, and endurance considerations, the basic components of a MCFC fuel cell must be: easily manufactured by simple scalable techniques, stable in the fuel cell, and able to meet threshold performance levels.

Molten carbonate fuel cell (MCFC) components are thin, flat materials with a porosity and pore size distribution carefully tailored for proper electrolyte distribution by virtue of capillarity. The basic cell package typically consists of an anode, a cathode, one or more bubble barriers, and an electrolyte structure composed of a matrix and an electrolyte retained in the matrix by capillarity.

Present state-of-the art production processes for manufacturing MCFC components include tape casting and dry, loose packing/sintering of component powders.

Tape casting, a "wet" process, involves the mixing of component powders with a liquid binder which contains additives custom tailored to impart desired properties to the powder/binder suspension. This mixture is then "casted" into a uniform tape via a "doctor blade" which strikes across the slurry surface at controllable heights. These tapes are dried and, depending on the casted component, further processed through pore-size-fix rolling, binder burnout, sintering, thickness-set-rolling, and annealing steps.

The "loose packing" method involves the spreading of dry powders within a recessed die and "striking" the top powder surface with a straight-edge. This method is still used by some developers for making electrodes. Like tape casting, subsequent processing steps may include sintering, thickness-set-rolling, and annealing.

As MCFC technology moved into the commercialization phase of the development process, the target active area for MCFC components increased from 16 $in^2$ to 1 $ft^2$ to up to 10 $ft^2$. This increase in size has brought to light the scalability of the present porous component manufacturing techniques, particularly with regard to quality control and subsequent handleability and ease of assembly. State-of-the-art manufacturing techniques are at best "pushed" to attain and assure uniform thickness, surface, and microstructural tolerances and strength through numerous drying, rolling, and sintering steps. Additionally, tape and dry-loose casting methods presently require that as many as six to ten large pieces be assembled to stringent fit-up tolerances to make a single cell. Typically the cathode, anode, and anode bubble barrier will each be fabricated from two pieces of material and the electrolyte structure from three pieces.

SUMMARY OF THE INVENTION

It has now been discovered that the quality and handleability/assembly problems of scaled up, presently available processes for manufacturing electrochemical devices and their components can be solved by employing plasma spraying to fabricate MCFC and other electrochemical devices and components.

Uniform, large size devices and components can be obtained with fewer process steps, and the number of pieces required for a fuel cell of commercially useful size can be significantly reduced.

The spray gun and substrate can be integrated into a numerically controlled center to standardize thickness and morphology. The plasma sprayed metal powders require no subsequent drying or sintering.

An entire device such as a MCFC or a SOFC can be made by plasma spraying appropriate powders one on another to produce a laminate of tightly adhered components. Consequently, plasma spraying offers high production rates and large scale, high quality, integrated cell package components which can meet the requirements of MCFC power plant commercialization and other demanding electrochemical applications.

The objects, features, and advantages of the invention will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
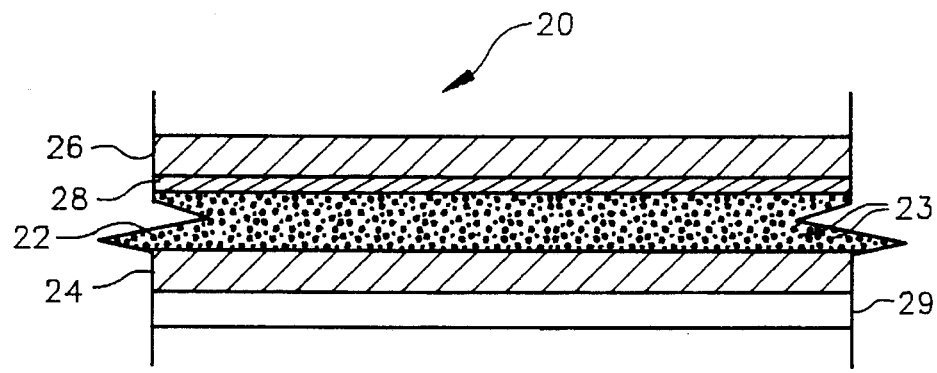
FIG. 1 is a generally pictorial side view of a molten carbonate fuel cell embodying the principles of the present invention and of a substrate on which the fuel cell or one or more of its components may be fabricated by plasma spraying, also in accord with the principles of the invention.

Referring now to the drawing, FIG. 1 depicts a molten carbonate fuel cell 20 which can be fabricated by using plasma spraying in accord with the principles of the present invention.

Fuel cell 20 has an electrolyte matrix 22 filled with an electrolyte 23 which is typically a eutectic carbonate mixture. This electrolyte structure (matrix plus electrolyte) is sandwiched between and laminated to a cathode or air electrode 24, an anode or fuel electrode 26, and an anode bubble barrier 28 located between electrolyte structure 22, 23 and anode 26.

If the electrolyte filed matrix 22 does not pose an adequate barrier to the fuel and oxidant or the matrix cracks, the fuel and oxidant may mix. At a minimum, this may result in a voltage drop and/or a loss of fuel. In more severe cases, there may be service life shortening oxidation of anode 26 and/or the creation of a potential safety hazard. In fuel cell 20, the pores of bubble barrier 28 fill up with the electrolyte and prevent mixing of the fuel and oxidant in circumstances less catastrophic than those which result in a blowout of the electrolyte.

Fuel cell 20 has a Ni+Cr anode 26, a Ni+Al$_2$O$_3$ bubble barrier 28, and a Ni cathode 24. These are thin, flat members with a porosity and pore size distribution carefully tailored for proper electrolyte distribution by virtue of capillarity.

The electrolyte matrix 22, typically LiAlO$_2$, has a nominal porosity of 45% to 65% and a mean pore size of 0.2–0.5 µ. It has the smallest pore size of the various components because it is required to be completely filled with electrolyte 23.

The optional bubble barrier 28, typically a Ni-Al$_2$O$_3$ composite, is also required to be completely filled with electrolyte. However, because its particles are relatively large, even with a low porosity the resulting mean pore size, 0.5–1.0µ, is larger than that of matrix 22.

The anode 26 and cathode 24 mean pore sizes are larger than those of matrix 22 and bubble barrier 28, as is required to prevent them from becoming flooded with electrolyte. The nominal mean pore sizes are 3–6µ for Ni+Cr anodes and 5–8µ for Ni cathodes (which are oxidized in-situ to form NiO). The porosity of cathode 24 ranges from 60% to 80%.

An appropriate fuel, typically a humidified H$_2$/CO$_2$ mixture, is fed to fuel cell anode 26. Here, the fuel reacts with carbonate ions in the electrolyte to generate an excess of electrons in accord with the following typical equation:

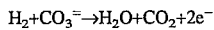

$$H_2 + CO_3^= \rightarrow H_2O + CO_2 + 2e^-$$

An oxidant, typically an air/CO$_2$ mixture, is fed to cathode 24. Electrons flow from anode 26 through an external load (not shown) to the fuel cell cathode where the following reaction may occur:

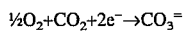

$$\tfrac{1}{2}O_2 + CO_2 + 2e^- \rightarrow CO_3^=$$

The circuit is completed by ionic transport through electrolyte 23.

As discussed above, it is a salient feature of the present invention that the components of fuel cell 20—electrolyte structure 22, 23, cathode 24, anode 26, and bubble barrier 28 (if employed)—are fabricated by plasma spraying. Plasma spraying involves the ionization in a plasma generator and via a continuous, high power, DC arc of an inert gas or gas mixture such as argon, argon-helium, or nitrogen-hydrogen. This produces a high temperature, high velocity plasma effluent which emanates from the nozzle of the generator.

Spray powder of, or reactable in the process to, the composition wanted in the component being fabricated is injected into the effluent and is heated to a molten or semi-plastic state, accelerated, and transported at a relatively high velocity to a target substrate where it impacts and resolidifies in a layer-type deposit.

The tailoring of plasma temperature, plasma jet speed, nozzle design, nozzle-to-substrate distance and angle, substrate surface characteristics, and feed powder morphology, particle size, and composition to control coating quality has been thoroughly explored and widely documented—see Levine and Miller, Ceramic-coated metals can survive contact with hot working fluid, RESEARCH & DEVELOPMENT, March 1984, pp. 122–125 (metal bond coatings and zirconia-based thermal barrier coatings) and Wachtman and Haber, Ceramic Films and Coatings, CEP, January 1986, pp. 39–46 (plasma spraying assembly and coating quality). Consequently the plasma spraying equipment and methodology will not be described herein.

High porosity and proper pore size distribution are key requirements of fuel cell and other electrochemical device components, and the plasma spraying process is so carried out as to fulfill those requirements. This is distinctly different from the way plasma spraying has heretofore been employed— i.e., to produce high density coatings, often preferably with a maximum porosity of 5 percent.

The components can be individually fabricated by spraying an appropriate powder onto a standard substrate 29 such as copper or aluminum plate and then removing the component from the substrate for assembly into a fuel cell or other device. Alternatively, successive, multiple layers of appropriately formulated powders can be deposited on a substrate such as 29 or on a previously fabricated component such as air electrode 24 to make laminates which are, or can easily be assembled into, fuel cells and other devices.

The working examples which follow describe tests carried out to verify that fuel cell components of the conventional, thin, flat configuration illustrated in FIG. 1 can be fabricated by plasma spraying.

Commercial plasma spray equipment and methodology and the following powders were utilized:
Ni powder for a cathode,
LiAlO$_2$/carbonate powder for an electrolyte-structure,
Ni-2Al/carbonate filler powder for an anode, and
Ni-LiAlO$_2$ powder for a bubble barrier.

EXAMPLE I

Cathode (Nickel Powder)

Nickel powder was plasma sprayed onto metal substrates to verify the ability of plasma spraying to produce porous coatings. To build up thickness, several passes with the plasma spray gun were used.

Figure 2:
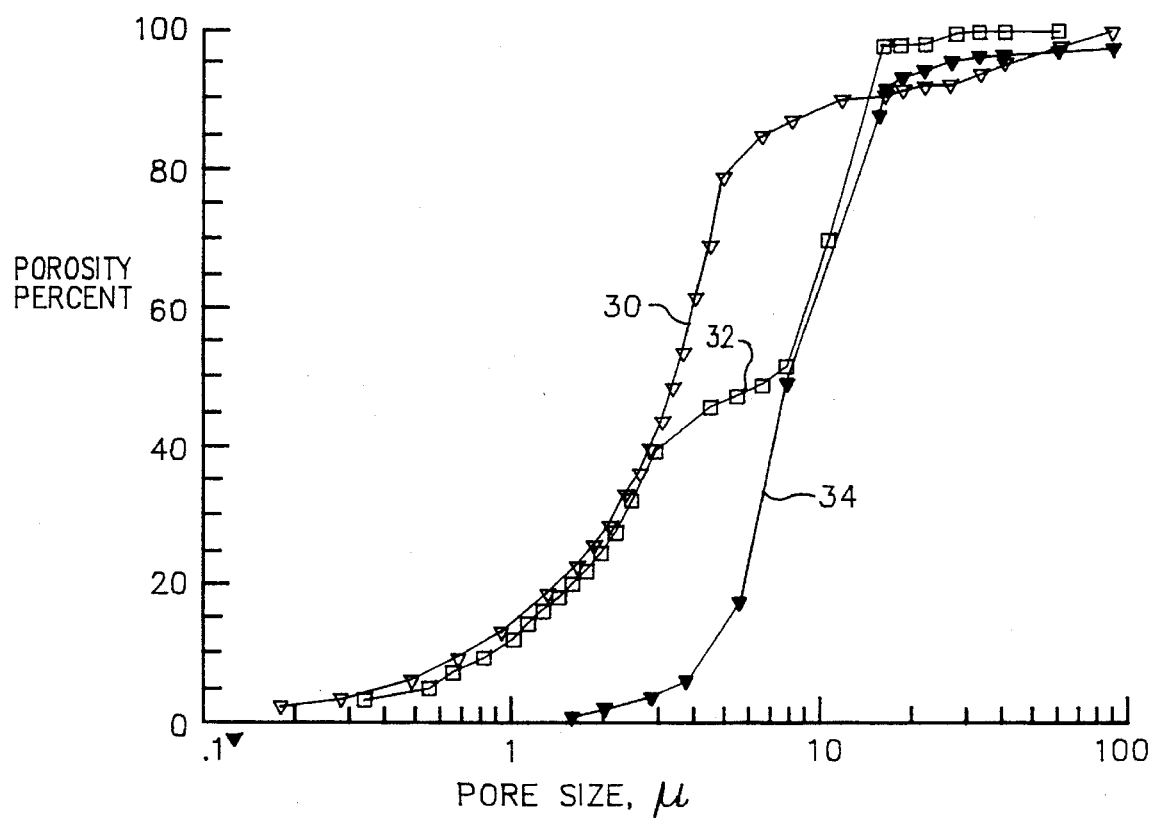
FIG. 2 is a graph showing the pore size distribution of two novel, plasma sprayed fuel cell cathodes and of a conventional Ni cathode, included for purposes of comparison.

Pore size distributions of two plasma sprayed cathodes, along with that of a typical Ni cathode plaque, are shown in FIG. 2 and identified respectively by reference characters 30, 32, and 34. One plasma sprayed cathode (curve 32) had a porosity of 36% and a bimodal pore size distribution with the smaller pores mostly within the range of 0.5–2.0μ and the larger pores greater than 9.0μ. The other plasma sprayed cathode (curve 30) had 24% porosity and a relatively sharp pore size distribution curve with a mean pore size 3.0μ.

The microstructure appears as densely packed nickel particles which are fused together. Most particles are~2–5μ in size; this particle size is typical of the starting nickel powder. By empirically adjusting the spray parameters, porosities and microstructures closely matching those of conventional MCFC (curve 34) cathodes can be obtained.

EXAMPLE II

Electrolyte Structure ($LiAlO_2$/Carbonate Mixture)

A granulated, –80 mesh, fusion product of $LiAlO_2$ and carbonate—for example, a eutectic lithium/potassium carbonate mixture—, generally referred to as electrolyte powder, was prepared and plasma sprayed to form an electrolyte structure. The structure that was obtained in this particular test lacked uniform density over the span of the structure. However, the dense portions of the microstructure appear to be a homogeneous blend of fine $LiAlO_2$ and carbonate; i.e., exactly what is desired for an electrolyte structure. Techniques for achieving variable density plasma sprayed coatings are well established and can be employed to retune the plasma spray process and produce plasma sprayed electrolyte structures which are of uniform density throughout.

EXAMPLE III

Anode (Ni-2Al/Carbonate Filler)

The addition of carbonate to spray powders for electrodes and bubble barriers allows acceptable porosity coatings to be fabricated by plasma spraying. The carbonate is used as a filler and subsequently drained upon melting by capillarity.

Such a powder mixture for a Ni-2Al anode was formulated to yield a composition of 40 vol % metal and 60 vol % of 62 Li/38 K carbonate. Plasma spraying of this powder produces an anode of at least 60% porosity corresponding to the carbonate volume.

The metal phase, which was assumed to be Ni-2Al, appears as a continuous network of ~10μ size particles. The carbonate phase consists of fine submicron crystallites distributed throughout the pores of the continuous network. Adjustment of the plasma spray parameters and the morphology of the spray powder can be utilized to produce a microstructure which has smaller metal particles and is more optimally suited for use as a MCFC anode.

EXAMPLE IV

Bubble Barrier (Ni-$LiAlO_2$/Carbonate Spray Powder)

A sprayable mixture for a Ni-$LiAlO_2$ bubble barrier containing 49 vol % Ni, 12 vol % $LiAlO_2$, and 39 vol % carbonate was evaluated. Again, the purpose of the carbonate was to provide porosity to the sprayed product which, in this case, has a target minimum of 39%.

The carbonate phase appears as 1–3μ granules covering the nickel phase, which is composed of 5–10μ round particles (lower middle of micrograph). The $LiAlO_2$ phase appears to be agglomerated (upper right of micrograph). Dispersion of the $LiAlO_2$ can be improved by using a more homogeneous spray powder.

As discussed above, plasma spraying may be employed to fabricate a wide variety of electrochemical device components such as MCFC electrodes, electrolyte structures, and bubble barriers and even complete devices; eng., MCFC's. Virtually any other metal, metal oxide, oxide, or salt electrolyte component for virtually any electrochemical power, gas, chemical, or fuel production device, regardless of configuration or design philosophy, can also be fabricated by applying the principles of the present invention as developed above.

In short, the invention may be embodied in many forms without departing from the spirit or essential characteristics of the invention. The present embodiments are therefore to be considered in all respects as-illustrative and not restrictive, the scope of the invention being indicated by the appended claims rather than by the foregoing description. All changes which come within the meaning and range of equivalency of the claims are therefore intended to be embraced therein.

What is claimed is:

1. A fuel cell comprising:

a porous electrolyte matrix, an air electrode, and a fuel electrode;

said electrolyte matrix being located between said electrodes; and said electrolyte matrix and said electrodes each being a solidified plasma and said air electrode and said fuel electrode being laminated to the electrolyte matrix.

2. A fuel cell as defined in claim 1 which has a bubble barrier sandwiched between and laminated to one of said electrodes and the electrolyte matrix, said bubble barrier being a solidified plasma.

3. A fuel cell as defined in claim 1 which has a $LiAlO_2$ electrolyte matrix with a porosity of about 45 to 65 percent and a mean pore size in the range of about 0.2 to 0.5 μm.

4. A fuel cell as defined in claim 1 which has a Ni+Cr fuel electrode with a porosity of about 50 to about 70 percent and a mean pore size of about 3 to about 6 μm.

5. A fuel cell as defined in claim 1 which has a NiO air electrode with a porosity of about 60 to about 80 percent and a mean pore size in the range of 5–8 μm.

6. A fuel cell as defined in claim 1 which also includes a bubble barrier, said bubble barrier being a Ni-$LiAlO_2$ porous composite with a mean pore size in the range of about 0.5 to 1.0 μm and a porosity of at least about 39 percent.

* * * * *